United States Patent
Nakamura et al.

[11] Patent Number: 5,905,918
[45] Date of Patent: May 18, 1999

[54] DISPLACEMENT MECHANISM CONTROL DEVICE IN A CAMERA

[75] Inventors: Toshiyuki Nakamura, Tokyo; Tatsuo Amanuma, Santama-ken; Hidenori Miyamoto, Chiba-ken; Minoru Kato, Kanagawa-ken, all of Japan

[73] Assignee: Nikon Corporation, Tokyo, Japan

[21] Appl. No.: 08/780,390

[22] Filed: Jan. 8, 1997

Related U.S. Application Data

[63] Continuation of application No. 08/376,412, Jan. 23, 1995, abandoned.

[30] Foreign Application Priority Data

Mar. 3, 1994 [JP] Japan .................................. 6-033718

[51] Int. Cl.⁶ .................................................. G03B 17/00
[52] U.S. Cl. .................................................... 396/87
[58] Field of Search ........................... 354/195.1, 195.11, 354/195.12, 400; 396/76, 77, 86, 87, 134

[56] References Cited

U.S. PATENT DOCUMENTS

| | | | |
|---|---|---|---|
| 4,908,647 | 3/1990 | Ueyama | 354/402 |
| 4,936,664 | 6/1990 | Haraguchi et al. | 350/429 |
| 5,210,558 | 5/1993 | Kobayshi et al. | 354/195.1 |
| 5,237,362 | 8/1993 | Ishino et al. | 354/400 |

FOREIGN PATENT DOCUMENTS

0267298  8/1992  European Pat. Off. .
5-215951 8/1993  Japan .

Primary Examiner—David M. Gray
Assistant Examiner—Christopher E. Mahoney
Attorney, Agent, or Firm—Oliff & Berridge PLC

[57] ABSTRACT

A camera displacement mechanism control device can maintain the time required to effect removal of backlash within a set time. Zooming-down is started by the zoom-down switch being turned ON, and the lens barrel is driven as far as the wide-angle terminus if the zoom-down switch is not turned OFF during zooming-down. Alternatively, if the zoom down switch is turned OFF during zooming-down, the lens barrel is driven to the next halt position after the position where the zoom-down switch was turned OFF. In either case, the lens barrel is caused to overshoot the target halt position in the direction of scrolling-in for a time interval long enough to effect removal of backlash, and is subsequently driven in the direction of scrolling-out and halted at the described target halt position.

21 Claims, 6 Drawing Sheets

DISPLACEMENT MECHANISM CONTROL DEVICE IN A CAMERA

This is a Continuation of application Ser. No. 08/376,412 filed Jan. 23, 1995, now abandoned.

FIELD OF THE INVENTION

The present invention relates to a displacement mechanism control device used in a camera. In particular the present invention relates to a displacement mechanism in a camera having a plurality of stop positions, e.g., a control device that can be applied to control a power zoom camera's lens barrel or focussing mechanism.

DESCRIPTION OF RELATED ART

In general, there is backlash, or mechanically created play, in the displacement mechanism component of a camera. For example, in current zoom lens barrel mechanisms, depending on the direction of driving of the zoom lens, backlash is created by play in the gears and by play in the cam mechanisms as force from the drive motor causes the lens barrel to be displaced via an array of gears and cam mechanisms. This backlash causes a discrepancy in the halt position when the lens barrel is zoom driven in a drive direction and then halted, resulting in a detrimental effect on the precision of the photography. For example, when the drive target position (halt position) is reached by driving the lens in the direction of lens scrolling-out (as is one standard), no effects from backlash will be sustained at the halt position in the drive direction; however, the effects of backlash will occur when driving the lens in the direction of scrolling-in, which is the opposite direction of the scrolling-out direction.

Consequently, a lens barrel control device has conventionally been provided to control and prevent detrimental backlash effects on photography precision in the mechanism when halting the lens barrel during zoom driving of the focusing or zoom driving mechanism. The device provides control so that the lens barrel is moved in the direction enabling removal of backlash (the direction in which backlash effects are not received), immediately prior to halting the lens barrel.

For example, consider a case in which the direction that removes backlash is the direction of scrolling-out the lens barrel (i.e., the direction of zooming-up for telephoto photography). In such case, because backlash effects are not received during zoom-up, it is preferable to remove backlash by merely halting the lens barrel when the barrel is being scrolled-out. When zooming-down by scrolling-in the lens barrel, backlash is removed by allowing the lens barrel to overshoot the predetermined target halt position and thereafter reversing and scrolling-out the lens barrel until the target halt position is reached. In order to thus prevent backlash, it is necessary to secure sufficient overshooting when scrolling-in. Consequently, the motor is driven after the target position has been passed when scrolling-in.

Many of these cameras are equipped with a photointerrupter that detects the position of the lens barrel, and a standard position switch that detects the standard position (for example, an origin position) of the lens barrel. With this type of camera, the lens barrel control device detects that the lens is in the standard position using the standard position switch, and counts the pulses output from the photointerrupter with the standard position as the standard to detect the halt position on the basis of the count value when the lens is moved out of the standard position. In other words, the lens barrel control device detects the lens barrel target halt position using signals from the switch for standard position detection when halting driving of the lens barrel at the standard position, and detects the target position using the pulse number when halting at any other position.

With this type of camera, the amount of overshooting required to remove backlash is indicated by a pulse number. When indicated by a pulse number, no problem occurs when the actions of the camera are conducted normally. When the speed of the action is slower, for example, when the resistance of the mechanism components become large due to a weak battery or due to low temperature conditions, the speed of the actions are slowed. Consequently, the zoom time becomes longer when overshooting is based upon a designated pulse number. In general, because the release of the camera is prevented when the zoom lens barrel or focusing mechanism is being displaced, photography cannot be conducted during this time interval. Consequently, shutter opportunities can be missed.

SUMMARY OF THE INVENTION

An object of embodiments of the present invention is to provide a camera displacement mechanism control device that, when overshooting is caused in order to remove backlash, can maintain the time required to effect removal of backlash within a set time interval, and that can prevent missed shutter opportunities by preventing delays in the time required for displacement, even when the displacement drive speed is slow.

Another object of embodiments of the present invention is to provide a camera displacement mechanism control device that can keep the time required to effect removal of backlash within a set time interval even when the displacement mechanism is driven toward the terminus at which the standard position exists.

Still another object of embodiments of the present invention is to provide a camera displacement mechanism control device that allows the time needed to effect removal of backlash to be set in each camera; that can accurately secure the overshoot time needed to effect removal of backlash, which varies between cameras; and that can also prevent the setting of time intervals that are longer than necessary.

According to a first aspect of embodiments of the present invention, there is provided a camera displacement mechanism control device having a displacement mechanism that has a first drive direction and a second drive direction, the first drive direction being susceptible to backlash, the second drive direction being substantially insusceptible to backlash. The control device includes a timer for setting one of a first time interval and a second time interval and a control device for controlling the displacement mechanism in the first and second directions as the displacement mechanism is driven toward a target position, the control device controlling movement based on either one of said first and second time intervals, the second time interval being shorter than the first time interval. The control device causes the displacement mechanism to overshoot beyond the target position until a selected one of the first and second time intervals has elapsed, drives the displacement mechanism in the second driving direction and halts the displacement mechanism at the target position.

The displacement mechanism may include a zoom lens barrel mechanism for driving the lens barrel, and a first position signal output device may include a lens barrel switch.

In addition, a second position signal output device may include a device that outputs a pulse in accordance with the displacement of the displacement mechanism.

The control device may include a computer with a built-in counter. The computer can use the counter to count each time a pulse is output from the second position signal output device.

In addition, the camera displacement mechanism control device may include a non-volatile memory with overwrite capabilities with the first and second time intervals being stored in the non-volatile memory.

According to a second aspect of embodiments of the present invention, there is provided a displacement mechanism control device in a camera equipped with a displacement mechanism that is driven in a first driving direction and a second driving direction, the first driving direction being susceptible to receiving backlash effects and the second driving direction being substantially insusceptible to the backlash effects. The displacement mechanism control device includes a control device adapted to control movement of the displacement mechanism in the first driving direction and the second driving direction as the displacement mechanism is driven toward a target position. The control device causes the displacement mechanism to overshoot beyond the target position until one of a first time interval and a second time interval has elapsed, drives the displacement mechanism in the second driving direction and halts the displacement mechanism at the target position. The second time interval is shorter than the first time interval.

With embodiments of the present invention, the control device detects the relative position signal output from the second position signal output device in the first drive direction and halts the displacement motion of the displacement mechanism at the target position. After the displacement motion has initially reached the target position, the motion is caused to overshoot the position until a first time interval has elapsed. The displacement motion is then caused to occur in the second drive direction, the motion then being halted at the target position. Accordingly, it is possible to convert halting in the first drive direction, which receives the effects of backlash, into halting in the second drive direction, which does not receive the effects of backlash. Accordingly, backlash can be removed during driving in the first drive direction that receives the effects of backlash.

Because the amount of overshooting is set based upon a time interval, under normal usage conditions, the device functions the same as when the amount of overshooting is set based upon the pulse number. However, as described above, when the actions of the camera components become slower, the motion of the displacement mechanism is reversed and the mechanism moves toward the target position after a set time interval has elapsed. In this case, the actual amount of overshooting becomes smaller, and consequently, backlash may not be completely eliminated. However, the backlash corresponding to the amount of overshooting is eliminated, so the minimum necessary level of precision can be secured despite the fact that the elimination of backlash may be incomplete.

In addition, the control device detects the standard position signal output from the first position signal output device in the first drive direction and halts the displacement motion of the displacement mechanism at the target position. After the displacement mechanism has reached the target position, the mechanism is caused to overshoot the position until a second time interval has elapsed. Displacement is then caused to occur in the second drive direction, and then the mechanism is halted at the target position. Accordingly, when a standard position exists, it is possible to set the halt position using the standard position as a standard, thereby ending a determination of the halt position with a high degree of precision by resetting the relative position signal in which errors accumulate.

Furthermore, because the second time interval is set so as to be shorter than the first time interval, when the motion is halted on the standard position side, the motion can be halted in a shorter time in comparison to those instances where the first time interval is set. In other words, if the settings are such that the sum of the drive time between the target halt position and the standard position and the overshoot time from the standard position (i.e., the second time interval) equals the first time interval, the time interval needed to effect removal of backlash can be contained within a set time interval regardless of the halt position.

In addition, the first and second time intervals may be stored in a non-volatile memory with overwrite capabilities. Consequently, it is possible to measure the time required to prevent backlash in the camera and to set this value. Accordingly, it is possible to set the shortest time required to effect removal of backlash in various cameras, thereby making it possible to reduce, for example, the time required for zoom action. The time values can be stored in each camera, or a common value can be set for camera groups where it is known that there is little difference among the cameras.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Preferred embodiments of the present invention are described hereafter, with reference to the drawings.

Figure 1:
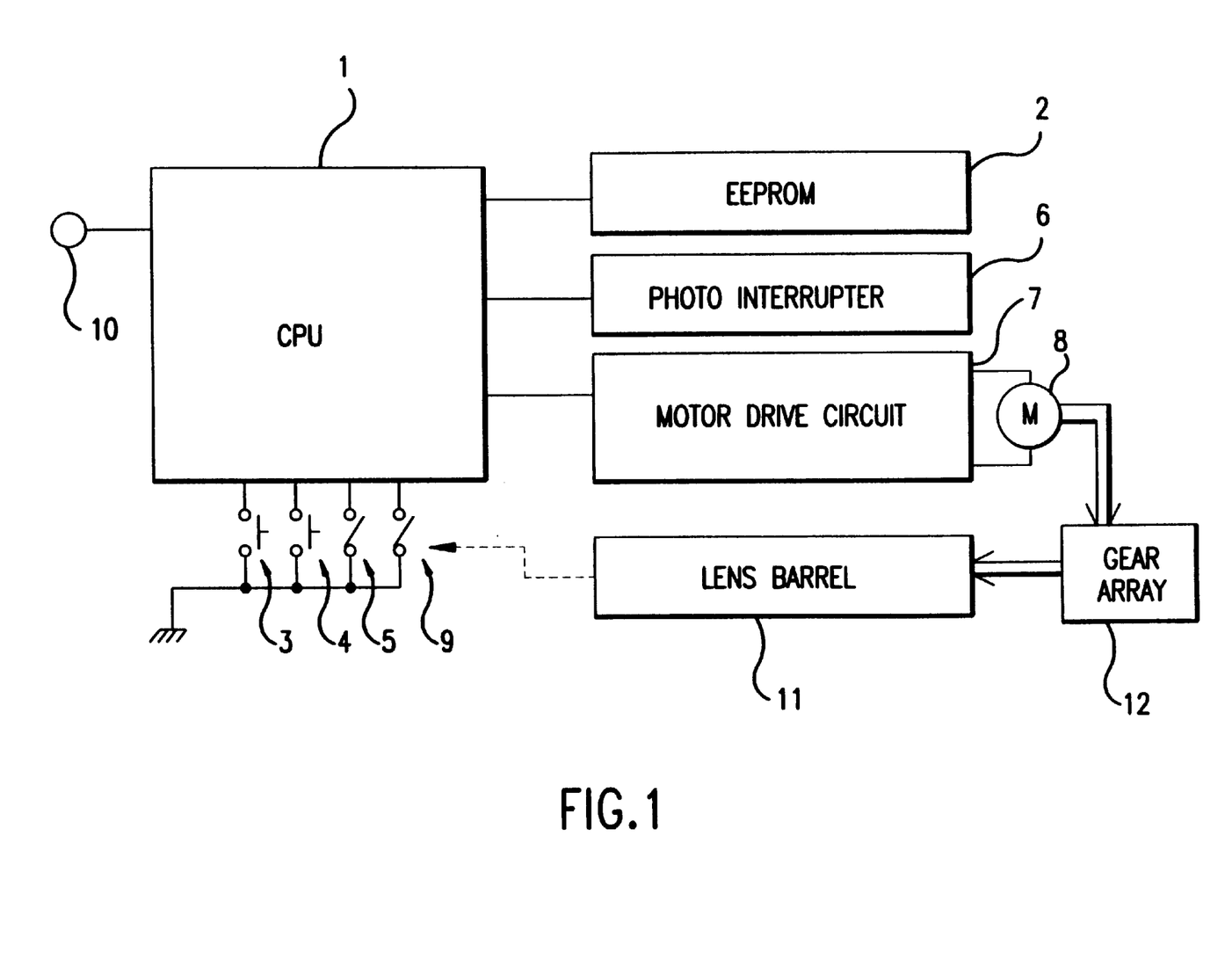
FIG. 1 is a schematic block diagram of a camera displacement mechanism control device according to an embodiment of the present invention.

FIG. 1 is a block diagram showing the control device for a zoom lens barrel mechanism that comprises one embodiment of the displacement mechanism control device of the present invention. In FIG. 1, the control device is equipped with a central processing unit (CPU) 1 that functions as a control means, an electrically erasable programmable read-only memory (EEPROM) 2, a photo-interrupter 6 and a motor drive circuit 7. Furthermore, the central processing unit (CPU) 1 is connected to a zoom-up switch 3, a zoom-down switch 4, a lens barrel switch 5 and an EEPROM write switch 9. In addition, a write terminal 10, which is used to write data and the like, is also provided in the central processing unit 1.

The present embodiment can be applied to a zoom lens barrel mechanism equipped with a lens barrel 11 that has a zoom mechanism, a motor 8 that effects zoom driving of the lens barrel 11, and a gear array 12 that transfers the drive force of the motor 8 to the lens barrel 11.

The EEPROM 2 stores data such as that shown in Table 1, including, for example, the time interval (explained hereinafter) that determines the amount of overshooting of the lens barrel 11, the EEPROM outputting the data based upon data read commands from the central processing unit 1. In addition, data is input into the EEPROM 2 from the write terminal 10 when the EEPROM write switch 9 is depressed, so that writing of data can be accomplished via the central processing unit 1.

TABLE 1

| Lens barrel position | | Pulse Number |
|---|---|---|
| Telephoto terminus | Z1 | 231 |
| | Z2 | 215 |
| | Z3 | 199 |
| | Z4 | 183 |
| | Z5 | 168 |
| | Z6 | 152 |
| | Z7 | 136 |
| | Z8 | 120 |
| | Z9 | 104 |
| | Z10 | 89 |
| | Z11 | 73 |
| | Z12 | 57 |
| | Z13 | 41 |
| | Z14 | 25 |
| Wide-angle terminus | Z15 | 10 |
| Lens barrel switch reversal | | 0 |

The zoom-up switch 3 is a normally open connection that is closed by a depression action and that opens when the depression action ends, and is specifically comprised of a depression button switch. This operation component is referred to hereafter as the zoom-up button. In addition, the zoom-down switch 4 is a normally open connection that is closed by a depression action and opens when this depression action ends, and is specifically comprised of a depression button switch. This operational component is referred to hereafter as the zoom-down button. These switches 3 and 4 output predetermined signals to the central processing unit 1 when they are closed. In addition, these switches continuously command zoom-up or zoom-down while being depressed, the command for zoom-up or zoom-down being halted when the depression action ends.

The lens barrel switch 5 is a switch that is used to conduct standard position detection of the lens barrel, the switch functioning as the primary signal output device that outputs a standard position signal. The lens barrel switch 5 is provided in a position scrolled farther in than the wide-angle terminus. The switch 5 is structured to remain closed within the normal zoom range and to open when the lens barrel is scrolled farther in than the wide-angle terminus.

The photo-interrupter 6 is a device used to detect the movement of the lens barrel, and functions as the second position signal output device that outputs a relative position signal that indicates the relative position from the standard position. The photo-interrupter 6 includes a light-emitting element and a light-receiving element (neither shown) on opposite sides of the coded portion of an encoder (not shown) provided, for example, on the lens barrel 11. The code on the encoder includes, for example, transparent areas and opaque areas in an alternating arrangement. The encoder can be comprised of either a rotary type or a linear type encoder, and is displaced accompanying a predetermined amount of displacement of the lens barrel 11 caused by the rotation of the motor 8. As a result, the photo-interrupter 6 detects the alternating transparent areas and opaque areas on the encoder, and sends to the central processing unit 1 an output signal (LPI) in which the logic level is alternately reversed. As a result, a series of pulses corresponding to the amount of movement of the lens barrel 11 is provided to the central processing unit 1.

The motor drive circuit 7 causes the motor 8, which can rotate in both forward and reverse directions, to rotate in the forward direction when the lens barrel 11 is to be moved in the direction of scrolling-out, and to rotate in the backward direction when the lens barrel 11 is to be moved in the direction of scrolling-in, in accordance with control signals from the central processing unit 1.

The central processing unit 1 controls all of the unrepresented various components in the camera, including the processes shown in the flowcharts in FIGS. 2 to 5, and is comprised, for example, of a computer with a built-in processor, ROM/RAM memory, counter, flag register, timer, I/O port and the like (all unrepresented in the drawing). Specifically, the CPU 1 includes a microcomputer or more precisely a microcomputer comprised of a single chip LSI. When information is input into the central processing unit 1 indicating that the above-described lens barrel switch 5 has been switched from an open state to a closed state, the central processing unit 1 resets the counter, considering the position of the lens barrel 11 at the time (i.e. indicating that the position of the lens barrel 11 is farther toward the scrolled-in side than the wide-angle terminus) to be the standard position. Furthermore, the central processing unit 1 counts a series of pulses from the above-described photo-interrupter 6 as the lens barrel moves from this position toward the telephoto terminus, and finds the current position of the lens barrel 11 on the basis of the total number counted, on the basis of which it controls the motor drive circuit 7.

Table 1 shown above indicates the relationship between the halt position of the zoom lens barrel 11 and the pulse number in the present embodiment, with the halt position being set at 15 possible locations. As indicated by Table 1, a pulse number corresponds to each of the halt positions Z1–Z15, with the telephoto terminus that is the farthest scrolled-out halt position being designated as Z1, the next farthest scrolled-out halt position being designated as Z2, the next farthest scrolled-out halt position being designated as Z3 and so on, with the wide-angle terminus, which is the farthest scrolled-in halt position, being designated as Z15. The largest pulse number, 231, corresponds to the telephoto terminus (Z1), while the smallest pulse number, 10, corresponds to the wide-angle terminus Z15. These pulse numbers are set in accordance with the distance of the corresponding halt position from a standard position that is scrolled-in farther than the wide-angle terminus Z15 and is the position at which the lens barrel switch 5 switches from an open state to a closed state (i.e. the position where the pulse count is 0).

Next, the braking actions of the structure will be described with reference to FIG. 1 and the flowcharts shown in FIGS. 2 to 5.

Figure 2:
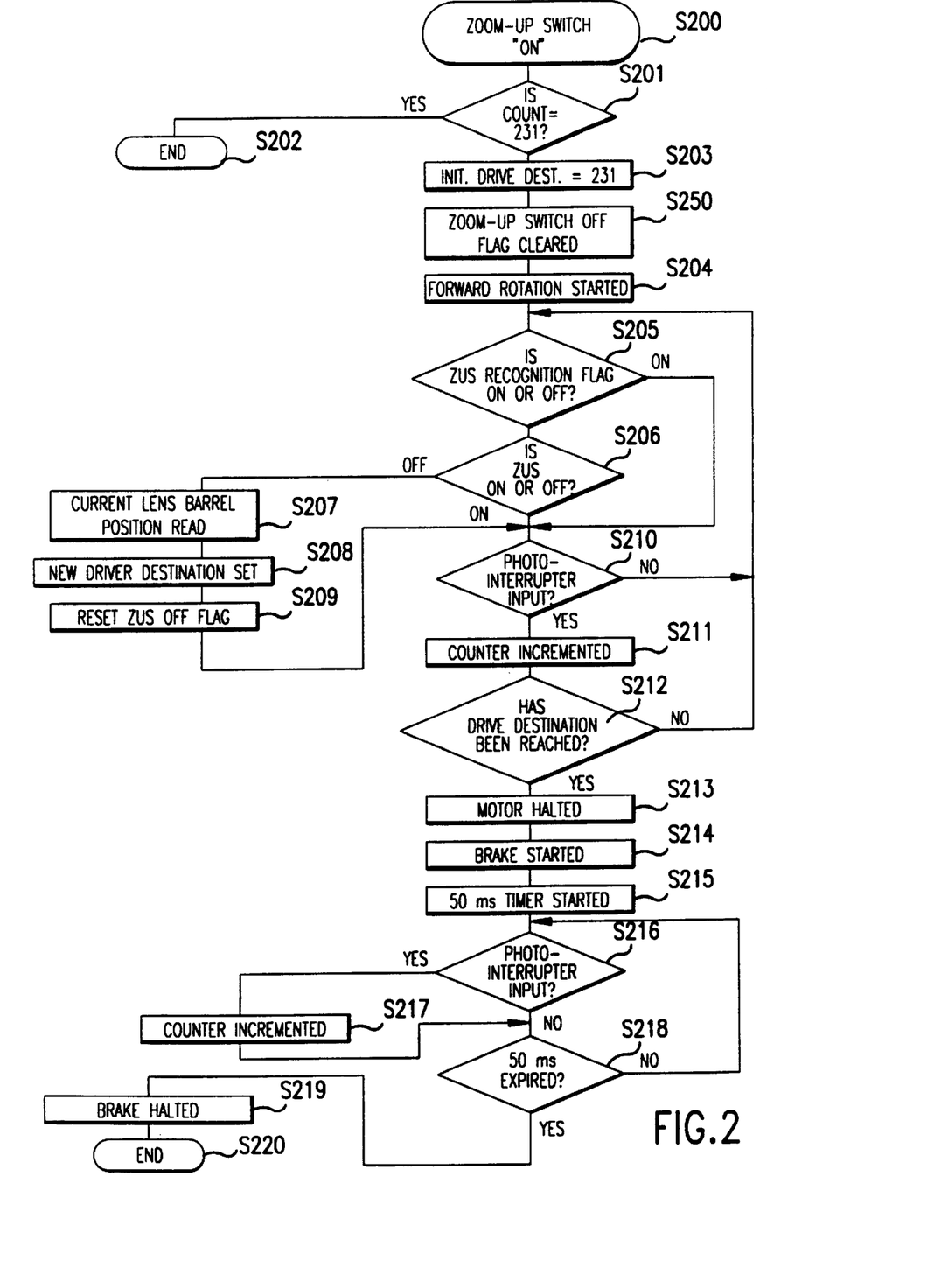
FIG. 2 is a flowchart of the zoom-up processes in the structure shown in FIG. 1.

FIG. 2 is a flowchart showing the processes of the described structure during zoom-up.

In FIG. 2, the CPU 1 starts the processes from step S200 when ON information is input from the zoom-up switch 3. In step S201, the built-in counter is read, and if the pulse number output from the photo-interrupter 6 is 231, the CPU advances to step S202 because the lens barrel 11 is at the telephoto terminus, and the process is concluded with the lens barrel 11 being halted at the telephoto terminus.

If the lens barrel 11 is not at the telephoto terminus in step S201, the CPU sets the drive destination of the lens barrel 11 to the telephoto terminus Z1 in step S203. The telephoto terminus Z1 comprises the drive destination when the zoom-up switch 3 is continuously ON. Next, the CPU moves to step S250 and clears the ZUS OFF recognition flag of the flag register. The ZUS OFF recognition flag is the flag used to discriminate whether the zoom-up switch 3 has turned OFF after zoom-up has commenced, and is set when the zoom-up switch 3 turns OFF during movement of the lens barrel 11.

In step S204, the CPU 1 sends a command to the motor drive circuit 7 for the forward rotation of the motor 8. Upon receiving this command, the motor drive circuit 7 causes the motor 8 to rotate in the forward direction. When driving of the lens barrel 11 in the direction of scrolling-out is started, the CPU 11 verifies the ZUS OFF recognition flag in step S205. If this comprises the initial verification, because the ZUS OFF recognition flag has not been reset, the CPU waits in step S206 for the zoom-up switch 3 to be turned OFF, and otherwise waits in step S210 for an interrupter signal to be output from the photo-interrupter 6.

When it is verified in step S206 that the zoom-up switch 3 has been turned OFF, the CPU 1, in step S207, verifies the count value of the pulse number output from the photo-interrupter 6, and from this value and the values in Table 1, finds the current position of the lens barrel 11. For example, if the pulse number was 100, because 89<100<104, the current position of the lens barrel would be between Z10 and Z9.

In step S208, the drive destination of the lens barrel 11 is reset on the basis of the above-described current position. The resetting of the drive destination is accomplished by subtracting from the drive destination position value a value equal to the pulse number corresponding to a below-described drive distance during motor braking, i.e. the braking distance. Accordingly, if this value is not larger than the pulse number of the current position, because halting is not possible at this position, the drive destination is set as the position corresponding to the next halt position. For example, with the above pulse number of 100, the current position of the lens barrel is between Z10 and Z9, and taking the pulse number corresponding to the braking distance to be, for example, 3, because the pulse number of the next halt position Z9 is 104, the drive destination pulse number becomes (104−3), which is larger than the pulse number (100) of the current position. Accordingly, in this case the drive destination becomes Z9. A drive destination during forward rotation means a motor halt position, which setting is also the same as in the other flowcharts, explained hereinafter.

Furthermore, in step S209, the CPU 1 sets the ZUS OFF recognition flag, by which means, movement from step S205 to step S206 is subsequently eliminated.

When an interrupter signal is input in step S210, the counter (not shown) in the central processing unit 1 is incremented by 1 in step S211. In step S212, the CPU 1 determines whether the count value of the pulse number has reached the pulse number (e.g. 101) of the motor halt position in order to halt at the drive destination (e.g. Z9) set in step S208. When the result of this determination is that the count value of the pulse number has not reached the described pulse number, the CPU repeats the processes from step S205 to step S212 via steps S210 and S211.

When the count value of the pulse number has reached the pulse number of the described drive destination, in step S213 the CPU 1 commands the motor drive circuit 7 to halt forward rotation of the motor 8, and in step S214 commands the start of motor braking. The motor drive circuit 7, upon receiving these commands, halts the forward rotation of the motor 8 and starts to apply a motor brake. In step S215, the CPU 1, after setting the built-in timer function to 50 ms, increments the counter by 1 each time a pulse is input from the photo-interrupter 6 in steps S216 and S217 until the time on the timer has expired (step S218). When it is detected that the time on the timer has expired (step S218), the CPU 1 commands the motor drive circuit 7 to release the motor brake (step S219). The motor drive circuit 7, upon receiving this command, halts motor braking of the motor 8, thereby concluding the above series of processes (step S220).

During the interval from step S213 through step S218, braking of the motor 8 is controlled, but because there is also the possibility that driving of the lens barrel will be continued due to inertia with no relation to the halting of the motor 8, counting of the interrupter signals by the counter is continued. In the described example, the pulse number is 101 and the pulse number corresponding to the braking distance is 3, so at the time of halting, the lens barrel is at the target halt position Z9, which corresponds to a pulse number of 104.

In addition, the wait time of 50 ms in step S215 is set to a value sufficient for halting the movement of the lens barrel. Accordingly, it is possible to completely halt the movement of the lens barrel in step S216.

With the described processes, zoom-up motion commences when the zoom-up switch 3 is turned ON, and the lens barrel is driven as far as the telephoto terminus if the zoom-up switch 3 is not turned OFF during the zoom-up motion. On the other hand, if the zoom-up switch 3 is turned OFF during the zoom-up motion, it is possible to move the lens barrel 11 as far as the next halt position after the switch 3 is turned OFF. In either case, because the direction of movement immediately prior to the halting of movement of the lens barrel is in the direction of scrolling-out, it is possible to halt the lens barrel 11 in a state in which backlash is almost completely eliminated.

Next, the actions during zoom-down will be described with reference to FIGS. 3 to 5.

Figure 3:
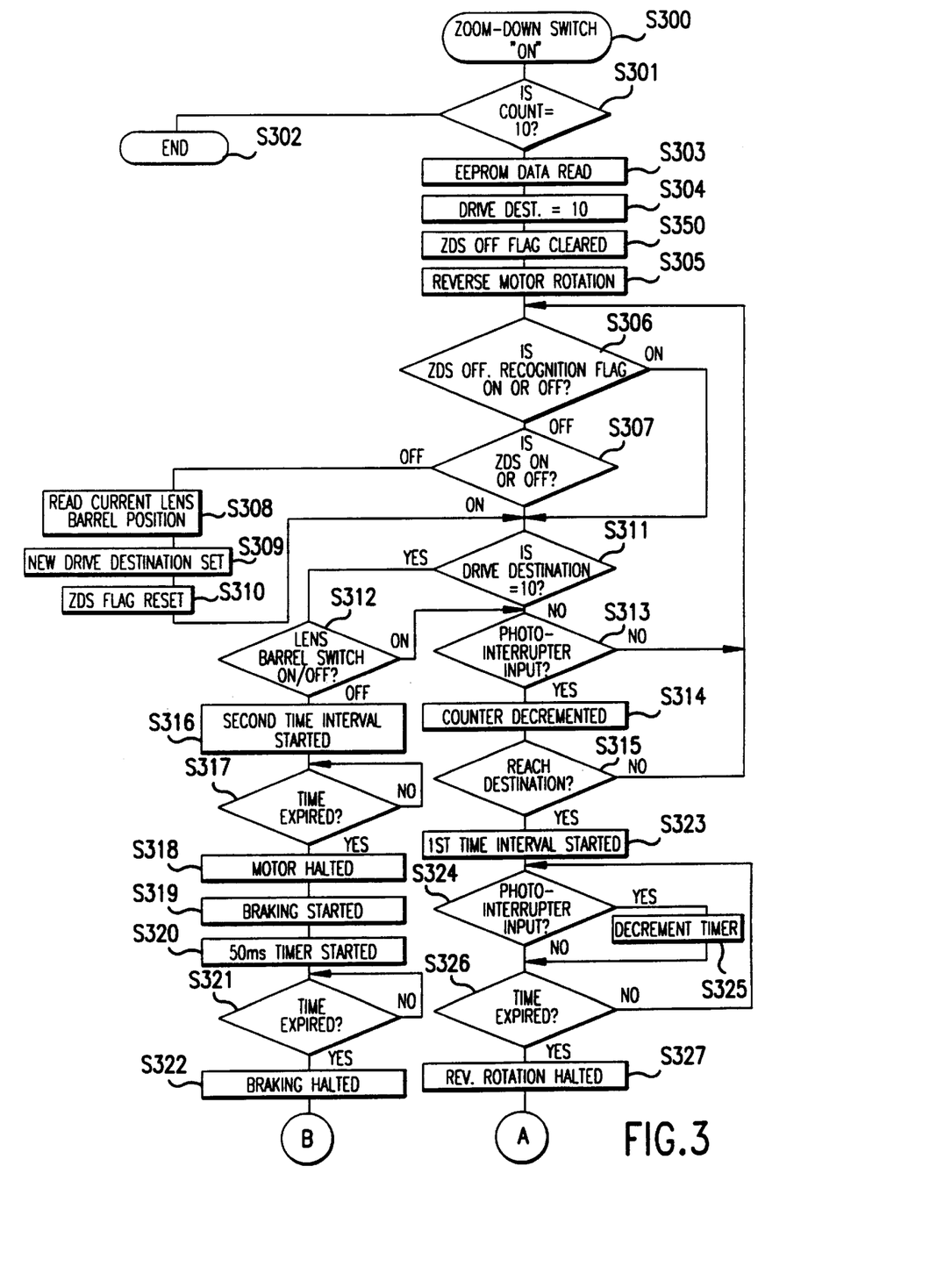
FIG. 3 is a flowchart of the zoom-down processes in the structure shown in FIG. 1.
Figure 4:
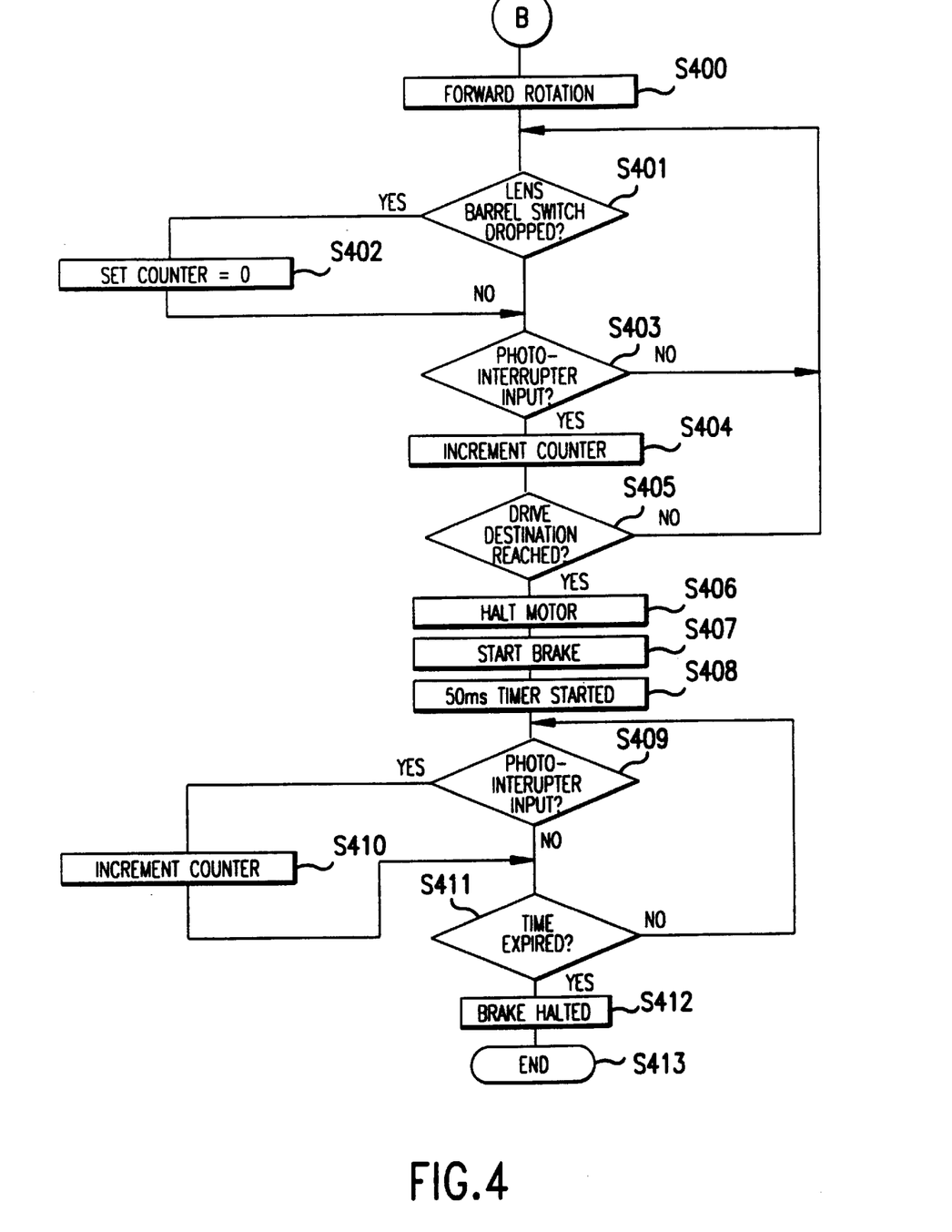
FIG. 4 is a flowchart of a further part of the zoom-down processes in the structure shown in FIG. 1.
Figure 5:
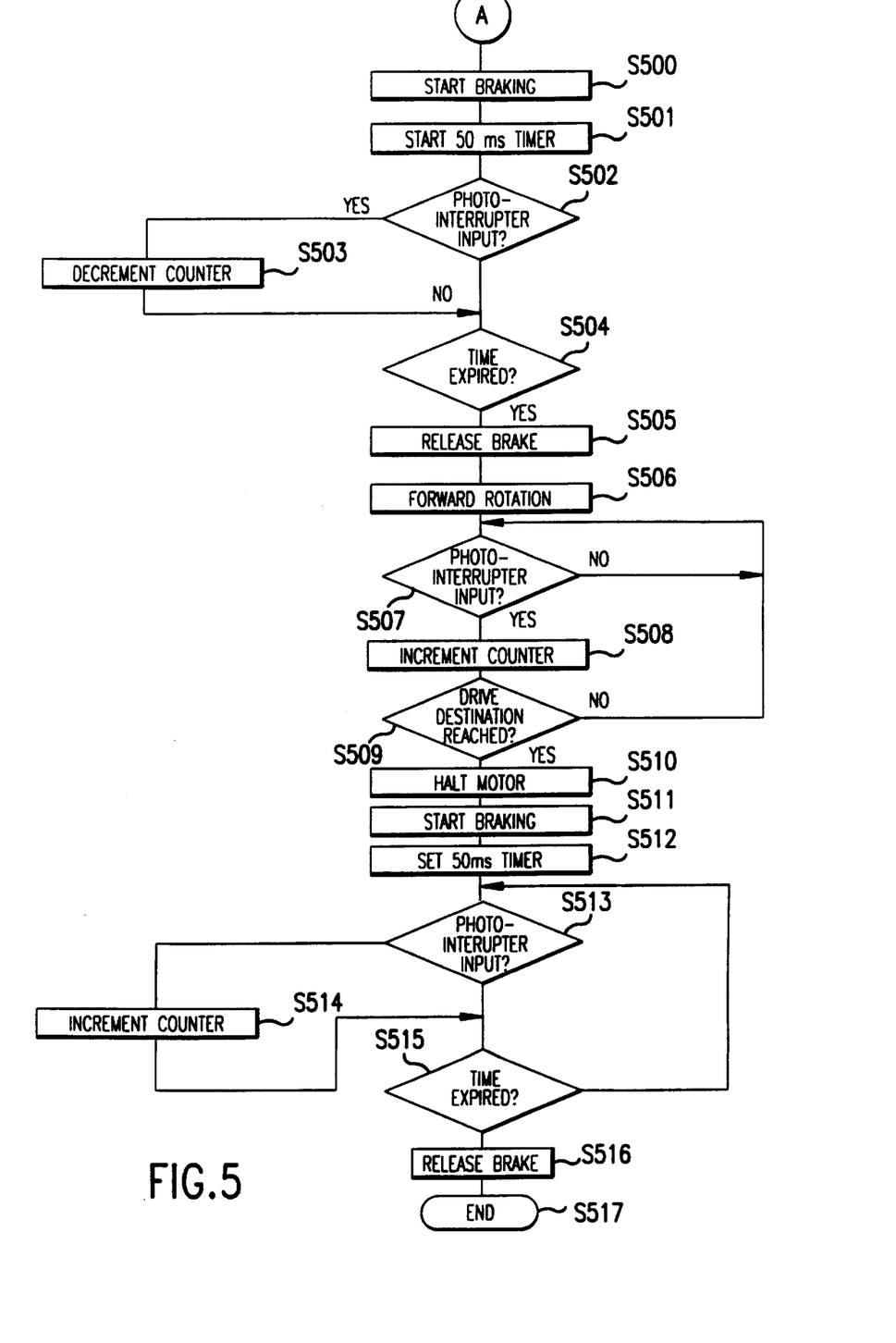
FIG. 5 is a flowchart of a further part of the zoom-down processes in the structure shown in FIG. 1.

FIGS. 3, 4 and 5 are flowcharts showing the processes of the described structure during zoom-down.

In FIG. 3, the CPU 1 starts the processes from step S300 when ON information is input from the zoom-down switch 4. In step S301, if the pulse number output from the photo-interrupter 6 is 10, the CPU advances to step S302 because the lens barrel 11 is at the wide-angle terminus Z15, the process being concluded with the lens barrel 11 being halted at the wide-angle terminus.

If the lens barrel 11 is not at the wide-angle terminus in step S301, the CPU in step S303 reads from the EEPROM 2 the first overshoot time interval for when the drive destination is a position other than the lens barrel switch position and the second overshoot time interval for when the drive destination is the lens barrel switch position. Furthermore, in step S304, the CPU sets the drive destination of the lens barrel 11 to the wide-angle terminus Z15, the wide-angle terminus Z15 comprising the drive destination when the zoom-down switch 4 is continuously ON.

The described first time interval is determined with the running speed of the lens barrel 11 under normal conditions being the standard to insure a displacement of sufficient length in order to remove backlash. The longer the first time interval, the better the backlash removal, but because excess time is needed for zoom driving, the first time interval is set by appropriately taking into consideration the mechanical precision of the camera, i.e. the length of backlash and usage conditions. Specifically, the first time interval is set, for example, at 80 ms.

On the other hand, the described second time interval is appropriately set so that the sum of the distance displaced at speeds under normal conditions after the lens barrel switch position is passed and the distance from the wide-angle terminus to the lens barrel switch position is a displacement of sufficient length to remove backlash. This length is specifically the same as the length estimated by the described first time interval. Because there are structural limits to the length of scrolling-in on the scrolling-in side of the lens barrel switch position, the second time interval is set so that this limit is not exceeded. Specifically, the second time interval is set, for example, at about 20 ms.

The reasons for setting the amount of overshooting at the wide-angle terminus in this way using a time interval with the lens barrel switch position as the standard are as follows. The lens barrel switch position comprises an absolute position standard, whereas in positions other than the lens barrel switch position, the position is detected using the described pulse number. Accordingly, the pulse number used for overshooting at places spaced away from the lens barrel switch position takes into account the facts that the absolute position is not known and that there is a possibility for errors to accumulate.

Scrolling of the lens barrel under normal conditions is the state wherein the zoom mechanism is driven according to designed values, for example, scrolling when the battery is not weak and under other than extremely cold conditions.

Next, the CPU moves to step S350 and clears the ZDS OFF recognition flag of the flag register. This ZDS OFF recognition flag is a flag used to determine if the zoom down switch 4 has been turned OFF after zooming-down has been started, and is set when the zoom-down switch 4 is turned OFF during movement of the lens barrel.

In step S305, the CPU 1 sends a command to the motor drive circuit 7 for reverse rotation of the motor 8. Upon receiving this command, the motor drive circuit 7 causes the motor 8 to rotate in the backward direction. When driving of the lens barrel 11 in the direction of scrolling-in is thus started, the CPU 1 verifies the ZDS OFF recognition flag in step S306. If this is the initial verification, because the ZDS OFF recognition flag has not been reset, the CPU waits in step S307 for the zoom down switch 4 to turn OFF, or waits in step S313 for an interrupter signal to be output from the photo-interrupter 6, and otherwise, if it is determined in step S311 that the drive destination is set as the wide-angle terminus, the CPU waits in step S312 for the lens barrel switch 5 to be turned OFF.

When it is verified in step S307 that the zoom-down switch 4 has been turned OFF, the CPU 1, in step S308, verifies the count value of the pulse number output from the photo-interrupter 6. From this value and the values in Table 1, the current position of the lens barrel 11 can be found. For example, if this pulse number were 60, because 57<60<73, the current position of the lens barrel 11 would be between Z11 and Z12.

In step S309, the drive destination of the lens barrel 11 is reset on the basis of the described current position. For example, with the above pulse number of 60 so that the current position of the lens barrel is between Z11 and Z12, the drive destination becomes Z12. Furthermore, in step S310, the CPU 1 sets the ZDS OFF recognition flag, by which means, movement from step S306 to step S307 is subsequently eliminated. The drive destination in such a case, unlike the case of forward rotation, is set to the actual target halt position. In the case of reverse rotation, after overshooting has been completed, movement to the target position is accomplished through forward rotation, so the above is used as the criteria for overshooting.

Figure 6:
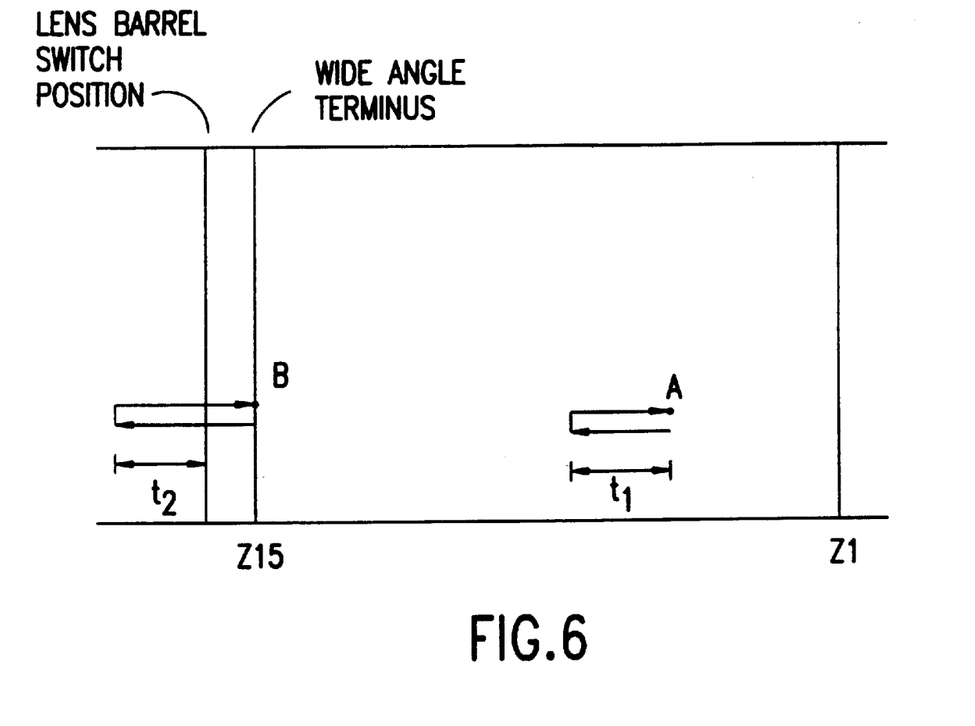
FIG. 6 is a diagram showing overshooting during zoom-down processes.

When the drive destination is not the wide-angle terminus, i.e. when the drive destination is reset in step S309, the CPU 1 observes the input of pulses from the photo-interrupter 6, and when a pulse is input, the counter is decremented (in steps S313 and S314). Furthermore, the CPU 1 reads the counter and determines whether the count value of the pulse number has reached the pulse number (e.g. 57) of the drive destination (e.g. Z12) set in step S309 (S315). If it is determined that the drive destination has not been reached, the CPU repeats the processes from step S306 on. If the determination is that the drive destination has been reached, a timer is started (step S323). Furthermore, the CPU 1 continues to cause the movement of the lens barrel 11 until the described first time interval set on the timer has elapsed. The movement of the lens barrel 11 is indicated in FIG. 6 by the U-shaped line terminating at a target position A. Moreover, during this interval, the counter is decremented each time a pulse is input from the photo-interrupter 6 (steps S324 and S325). When the time on the timer has elapsed, the CPU 1 commands the motor drive circuit 7 to halt the reverse rotation of the motor 8 (step S327).

Next, as shown in FIG. 5, the CPU 1 commands the commencement of motor braking and also starts the timer (steps S500 and S501). Furthermore, the CPU 1, decrements the counter each time a pulse is input from the photo-interrupter 6 (steps S502 and S503) until the braking time set on the timer, for example 50 ms, has expired. When the time on the timer has expired (S504), the CPU 1 commands the motor drive circuit 7 to release the motor brake (step S505).

Next, the CPU commands the motor drive circuit 7 to start forward rotation of the motor 8 (step S506). Furthermore, each time a pulse is input from the photo-interrupter 6, the CPU 1 increments the counter (steps S507 and S508). In addition, the CPU 1 reads the counter and verifies whether the count value of the pulse number has reached that of the drive destination (for example, the position corresponding to a pulse number found by subtracting the pulse number corresponding to the braking distance from the pulse number of Z12) (step S509). If the drive destination has not been reached, the CPU repeats the processes from step S507 on. When the drive destination has been reached, the CPU commands the motor drive circuit 7 to halt driving of the motor 8, and also commands the start of motor braking (steps S510 and S511).

Furthermore, the CPU 1 starts a timer, and increments the counter each time a pulse is input from the photo-interrupter 6 (steps S512 to S514) until the braking time set on the timer, for example 50 ms, has elapsed. When the time on the timer has expired, the CPU commands the motor drive circuit 7 to release the motor brake (step S516).

Accordingly, the result of adding the pulse number corresponding to the braking distance to the pulse number at the time forward rotation of the motor is halted is that the value becomes the pulse number of the target position, and the lens barrel 11 reaches the target position. Accordingly, the above series of processes is concluded, and photography becomes possible (step S517). When the battery is weak and the lens barrel driving speed is slow, there are cases where the lens barrel may not return to the target position within the set time interval. Even in this case, however, the precision of photography is not perfect but after the set time interval has elapsed, photography is enabled so shutter opportunities are not missed.

A description of the case shown in FIG. 3 is described hereafter, where the drive destination is comprised of the wide-angle terminus.

If the drive destination is set as the wide-angle terminus in step S311, the CPU verifies in step S312 whether the lens barrel switch 5 is ON, and if the verification is that the switch is ON, the CPU moves to step S313. Because it is verified that the current position of the lens barrel 11 is to the scrolling-out side of the position of the lens barrel switch 5, it is necessary to move the lens barrel further toward the scrolling-in side. When the verification in step S312 is that the lens barrel switch 5 is OFF, the lens barrel 11 has scrolled in farther than the wide-angle terminus, and because of this the CPU starts a built-in timer in step S316, and in step S317 causes the lens barrel 11 to overshoot until the second time interval on the timer has elapsed. The movement of the lens barrel 11 is indicated in FIG. 6 by the U-shaped line terminating at the wide-angle terminus target position B. Following this, in step S318 the CPU commands the motor drive circuit 7 to halt reverse rotation of the motor 8. The motor drive circuit 7, upon receiving this command, causes the motor 8 to halt reverse rotation. In step S319, the CPU 1 commands the motor drive circuit 7 to start motor braking, and in steps S320 and S321 starts a built-in timer and waits for a 50 ms time interval to elapse. When this time has elapsed, the CPU 1 commands the motor drive circuit 7 to halt motor braking (step S322).

Next, the process of scrolling the lens barrel from the described overshoot position to the wide-angle terminus, which is the target halt position, is described with reference to the flowchart in FIG. 4.

In step S322, the lens barrel 11 is in a position scrolled farther in than the lens barrel switch position. The CPU 1 commands the motor drive circuit 7 to start forward rotation of the motor (step S400). The motor drive circuit 7, upon receiving this command, causes the motor 8 to begin rotating in the forward direction, in accompaniment with which the lens barrel 11 is displaced. The CPU 1 determines whether the lens barrel switch 5 has dropped and whether pulse signals are input from the photo-interrupter 6 (steps S401 and S403). When the dropping of the lens barrel switch 5 is detected, the counter is set to 0 (step S402). In addition, when a pulse signal is input from the photo-interrupter, the counter is incremented (step S404). Furthermore, the CPU verifies the count value, and repeats the above steps until the count value reaches the value of the drive destination (step S405). The value of the drive destination is set by anticipating the pulse number corresponding to the braking distance during braking, and subtracting the anticipated value of the pulse number corresponding to the braking distance from the pulse number of the true drive destination.

When the lens barrel 11 has reached the drive destination, the CPU 1 commands the motor drive circuit 7 to the halt forward rotation of the motor 8 and commands the commencement of motor braking (steps S406 and S407). The motor drive circuit 7 then halts the forward rotation of the motor 8 and starts to apply the motor brake. In addition, the CPU 1 starts a timer (step S408) and observes the input of pulses from the photo-interrupter 6 and increments the counter each time a pulse is input until the time on the timer has expired (step S409, S410 and S411). When the 50 ms on the timer has expired, the CPU 1 commands the motor drive circuit 7 to release the motor brake (step S412).

By means of the above steps, the pulse number corresponding to the braking distance is added to the pulse number at the time that forward rotation of the motor is halted, as a result of which the pulse number becomes that of the wide-angle terminus which comprises the target position, so that the lens barrel 11 reaches the wide-angle terminus.

In the present embodiment, even with a wide-angle terminus in which there is a structural limit to the length of scrolling-in, the overshoot time is set so that the scrolling distance is kept within this limit to the length of scrolling-in, with the lens barrel switch as the criteria. Accordingly, there are no structural problems.

As is clear from the above explanation, with the processes shown in FIGS. 3, 4 and 5 zooming down is started by the zoom-down switch 4 being turned ON, and the lens barrel moves as far as the wide-angle terminus (Z15) if the zoom-down switch 4 is not turned OFF during the zooming-down process. On the other hand, if the zoom down switch 4 is turned OFF during zooming-down, the lens barrel is driven to the next halt position (e.g. position Z12) from the position (e.g. the position indicated by pulse number 60) at which the zoom-down switch 4 was turned OFF.

In all of the described cases, the lens barrel is caused to overshoot the target halt position in the direction of scrolling-in for a time interval long enough to effect elimination of backlash, following which it is driven in the direction of scrolling-out and halted at the described target halt position. In other words, the drive direction of the lens barrel immediately prior to halting is in the direction of scrolling-out, because of which the lens barrel is halted with backlash having been eliminated.

The described first and second overshoot times are measured as the time needed to effect removal of backlash in each camera or in a set production lot, these values being written on the EEPROM. By this means, it is possible to set with a high degree of precision overshoot times in accordance with the variance in backlash caused by mechanical differences between cameras. Accordingly, it is possible to accurately assure a time interval necessary to effect removal of backlash, for which there is variation among the cameras, and it is also possible to prevent the time interval from being set any longer than is necessary.

In the described embodiment, a zoom lens barrel mechanism is shown in which the removal of backlash is possible through driving of the lens barrel in the direction of scrolling-out. However, this is intended to be illustrative and not limiting. It is also possible to have a structure in which the removal of backlash is accomplished through driving of the lens barrel in the direction of scrolling-in.

In addition, with the described embodiment, a lens barrel switch 5 is used as the means for outputting a signal to set the standard position, but other switches may be used here instead. Furthermore, the standard position is also not limited to the described wide-angle terminus, but can also be set as the telephoto terminus or some other arbitrarily selected position without any difference in results.

Furthermore, in the described embodiment, a photo-interrupter is used as the means for outputting a signal to indicate the relative position from the standard position, but this is intended to be illustrative and not limiting.

In addition, with the described embodiment, a control device for a zoom lens barrel mechanism is described, but the present invention is not limited to a control device for a zoom lens barrel mechanism but can also be applied, for example, to a control device for a displacement mechanism in a camera having a plurality of halt positions, such as a camera focusing mechanism.

As described above, with the disclosed configuration of the present invention, when the lens barrel is caused to overshoot to effect the removal of backlash, the amount of the overshooting is determined using time intervals, because of which it is possible to keep the time needed to effect removal of backlash within a set time. Accordingly, even when the drive speed of displacement is slow, delays in the time needed for displacement are prevented, thereby making it possible to prevent missed shutter opportunities.

In addition, when the displacement mechanism is driven in the direction toward the terminus where the standard switch is located, the overshoot time is set shorter than in the aforementioned case, with the standard switch as the standard. Therefore, it is possible to keep the time needed to effect removal of backlash within a set time interval.

Furthermore, by writing the described overshoot time on a memory with overwrite capabilities, it is possible to set the time needed to effect removal of backlash for each camera. Consequently, it is possible to accurately secure the time needed to effect removal of backlash, for which there is variation among cameras, and it is also possible to prevent the time from being set any longer than necessary.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A displacement mechanism control device in a camera equipped with a displacement mechanism that is driven in a first driving direction and a second driving direction, the first driving direction being susceptible to backlash effects and the second driving direction being insusceptible to said backlash effects, said control device comprising:

memory means for storing a first time interval and a second time interval; and control means for controlling movement of the displacement mechanism in the first driving direction and in the second driving direction as the displacement mechanism is driven toward a target position, said control means controlling movement based on one of said first and second time intervals;

wherein the control means causes the displacement mechanism to overshoot beyond a target position until one of said first and second time intervals has elapsed, drives the displacement mechanism in the second driving direction and halts the displacement mechanism at the target position; and wherein when the control means controls movement based on the first time interval, the first time interval is measured from a point in time when the displacement mechanism passes a relative position measured relative to a standard position, and wherein when the control means controls movement based on the second time interval, the second time interval is measured from a point in time when the displacement mechanism passes the standard position, and wherein the second time interval is shorter than the first time interval.

2. The camera displacement mechanism control device of claim 1, wherein the displacement mechanism comprises a zoom lens barrel mechanism.

3. The displacement mechanism control device of claim 2 wherein the first position signal output means comprises a lens barrel switch and the second position signal output means comprises an encoder that outputs a pulse in accordance with displacement of the displacement mechanism.

4. The displacement mechanism control device of claim 3, wherein the control means comprises a computer with a first built-in counter, wherein the computer uses the counter to count each time said pulse is output from the encoder.

5. The displacement mechanism control device of claim 1, wherein said memory means comprises a non-volatile memory with overwrite capabilities, and wherein the first time interval and the second time interval are stored in the non-volatile memory.

6. The displacement mechanism control device of claim 1, further comprising:

first position signal output means for outputting a standard position signal indicating a standard position of the displacement mechanism; and second position signal output means for outputting a relative position signal indicating a position of the displacement mechanism relative to the standard position.

7. The displacement mechanism control device of claim 1, further comprising:

a first position signal output device, coupled to said controller, that outputs a standard position signal indicating a standard position of the displacement mechanism; and a second position signal output device, coupled to said controller, that outputs a relative position signal indicating a position of the displacement mechanism relative to the standard position.

8. The displacement mechanism control device of claim 7, wherein the first position signal output device comprises a lens barrel switch and the second position signal output device includes an encoder that outputs a pulse in accordance with displacement of the displacement mechanism.

9. The displacement mechanism control device of claim 8, wherein the controller comprises a computer with a first built-in counter, and wherein the computer uses the counter to count each time a pulse is output from the encoder.

10. The displacement mechanism control device of claim 9, wherein the computer has a built-in timer by which the first time interval and the second time interval are set.

11. A displacement mechanism control device in a camera equipped with a displacement mechanism that is driven in a first driving direction and a second driving direction, the first driving direction being susceptible to backlash effects and the second driving direction being insusceptible to said backlash effects, said control device comprising:

a memory for storing a first time interval and a second time interval; and a controller adapted to control movement of the displacement mechanism in the first driving direction and in the second driving direction as the displacement mechanism is driven toward a target position;

wherein the controller causes the displacement mechanism to overshoot beyond the target position until one of the first time interval and the second time interval has elapsed, drives the displacement mechanism in the second driving direction and halts the displacement mechanism at the target position; and wherein when the controller controls movement based on the first time interval, the first time interval is measured from a point in time when the displacement mechanism passes a relative position measured relative to a standard position, and wherein when the controller controls movement based on the second time interval, the second time interval is measured from a point in time when the displacement mechanism passes the standard position, and wherein the second time interval is shorter than the first time interval.

12. The displacement mechanism control device of claim 11, wherein the displacement mechanism comprises a zoom lens barrel mechanism.

13. The displacement mechanism control device of claim 11, wherein said memory comprises a non-volatile memory with overwrite capabilities, and wherein the first time interval and the second time interval are stored in the non-volatile memory.

14. A method for controlling a displacement mechanism in a camera equipped with a displacement mechanism, wherein the displacement mechanism can be driven in a first driving direction susceptible to backlash effects and a second driving direction that is not susceptible to backlash effects, said method comprising the steps of:

determining whether to overshoot the displacement mechanism beyond a target position based on a first time interval measured from a point in time when the displacement mechanism passes a relative position measured relative to a standard position, or a second time interval measured from a point in time when the displacement mechanism passes the standard position;

overshooting the displacement mechanism beyond the target position based on the determined time interval;

driving the displacement mechanism in the second driving direction; and halting the displacement mechanism at the target position.

15. The method of controlling a displacement mechanism of claim 14, wherein the first time interval and the second time interval are set by a built-in timer of a computer.

16. The method of controlling a displacement mechanism of claim 14, further comprising the step of storing the first time interval and the second time interval in a non-volatile memory with overwrite capabilities.

17. The method of controlling a displacement mechanism of claim 14, wherein the step of overshooting includes overshooting the displacement mechanism beyond a relative position until said first time interval has elapsed when it is determined to overshoot based on the first time interval, and wherein the step of overshooting includes overshooting the displacement mechanism beyond a standard position until said second time interval has elapsed when it is determined to overshoot based on the second time interval.

18. The method of controlling a displacement mechanism of claim 17, wherein the camera includes a relative position signal output device for indicating a position of the displacement mechanism relative to a standard position, and wherein the relative position signal output device outputs a pulse signal in accordance with displacement of the displacement mechanism.

19. The method of controlling a displacement mechanism of claim 18, further comprising the step of counting each time said pulse is output from the relative position signal output device.

20. A control device for controlling a photographic optical system driving mechanism, comprising:

a timer that begins to count a first time interval when the optical system is driven past a relative position measured relative to a standard position and that begins to count a second time interval when the optical system is driven past the standard position; and a controller for controlling movement of the driving mechanism, wherein when the controller operates the driving mechanism in a first direction susceptible to backlash to position the optical system at a target position spaced apart from the standard position, the controller operates the driving mechanism in the first direction until the optical system passes the target position, continues to operate the driving mechanism in the first direction, halts the driving mechanism when the first time interval expires, then operates the driving mechanism in a second direction, opposite the first direction; to position the optical system at the target position, and wherein when the controller operates the driving mechanism in a first direction susceptible to backlash to position the optical system at a target position adjacent the standard position, the controller operates the driving mechanism in the first direction until the optical system passes the target position, continues to operate the driving mechanism in the first direction until the optical system passes the standard position, further continues to operate the driving mechanism in the first direction, halts the driving mechanism when the second time interval expires, then operates the driving mechanism in a second direction, opposite the first direction, to position the optical system at the target position.

21. The control device of claim 20, wherein the target position adjacent the standard position is a wide angle terminus position of the optical system.

* * * * *